US010178366B2

(12) United States Patent
Lucas

(10) Patent No.: US 10,178,366 B2
(45) Date of Patent: Jan. 8, 2019

(54) REAL-TIME 3D RECONSTRUCTION WITH A DEPTH CAMERA

(71) Applicant: Intel Corporation, Santa Clara, CA (US)

(72) Inventor: Blake C. Lucas, Santa Clara, CA (US)

(73) Assignee: INTEL CORPORATION, Santa Clara, CA (US)

(*) Notice: Subject to any disclaimer, the term of this patent is extended or adjusted under 35 U.S.C. 154(b) by 58 days.

(21) Appl. No.: 15/100,565

(22) PCT Filed: Jan. 3, 2014

(86) PCT No.: PCT/US2014/010151
§ 371 (c)(1),
(2) Date: May 31, 2016

(87) PCT Pub. No.: WO2015/102637
PCT Pub. Date: Jul. 9, 2015

(65) Prior Publication Data
US 2016/0301910 A1 Oct. 13, 2016

(51) Int. Cl.
*G06T 17/00* (2006.01)
*H04N 13/00* (2018.01)
*H04N 13/122* (2018.01)
*H04N 13/271* (2018.01)
*H04N 13/275* (2018.01)

(52) U.S. Cl.
CPC ........... *H04N 13/122* (2018.05); *G06T 17/00* (2013.01); *H04N 13/271* (2018.05); *H04N 13/275* (2018.05)

(58) Field of Classification Search
None
See application file for complete search history.

(56) References Cited

U.S. PATENT DOCUMENTS 8,659,593 B2 2/2014 Furukawa et al.
9,646,412 B1* 5/2017 Zegdoun ................. G06T 17/00
(Continued)

FOREIGN PATENT DOCUMENTS

CN 101156175 A 4/2008
CN 102364524 A 2/2012
(Continued)

OTHER PUBLICATIONS

"3D face reconstruction from two 2D images.", Video: Youtube, (Uploaded May 30, 2010), 0:23.
(Continued)

*Primary Examiner* — Reza Aghevli

(57) ABSTRACT

Systems and techniques for real-time 3D reconstruction with a depth camera are described herein. Depth measurements received from a depth camera of target may be stored in a depth-measurement data structure. A three-dimensional representation of the target may be stored in a model. A current depth image received from the depth camera may be registered to the model. The depth-measurement data structure may be modified with the current depth image based on the registration. The model may be deformed based on space carving and the modified depth measurement data structure.

21 Claims, 8 Drawing Sheets

(56) References Cited

U.S. PATENT DOCUMENTS

| | | | |
|---|---|---|---|
| 2009/0215533 A1* | 8/2009 | Zalewski | A63F 13/00 463/32 |
| 2009/0244062 A1 | 10/2009 | Steedly et al. | |
| 2010/0231583 A1 | 9/2010 | Furukawa et al. | |
| 2011/0090307 A1* | 4/2011 | Marvie | G06T 15/20 348/43 |
| 2012/0194644 A1 | 8/2012 | Newcombe et al. | |
| 2013/0100119 A1* | 4/2013 | Evertt | G06K 9/00201 345/419 |
| 2013/0100128 A1 | 4/2013 | Steedly et al. | |
| 2013/0162643 A1* | 6/2013 | Cardle | G06T 17/00 345/420 |
| 2013/0235033 A1 | 9/2013 | Kim et al. | |
| 2014/0025203 A1* | 1/2014 | Inazumi | B25J 9/1666 700/255 |
| 2014/0184749 A1* | 7/2014 | Hilliges | G01S 17/89 348/47 |
| 2015/0049807 A1* | 2/2015 | Gu | H04N 19/20 375/240.15 |
| 2015/0245061 A1* | 8/2015 | Chen | H04N 19/597 375/240.13 |

FOREIGN PATENT DOCUMENTS

| | | |
|---|---|---|
| CN | 102542601 A | 7/2012 |
| CN | 103201772 | 7/2013 |
| JP | 2003162549 | 6/2003 |
| JP | 2003162549 A | 6/2003 |
| JP | 2006039622 | 2/2006 |
| JP | 2009032122 | 2/2009 |
| JP | 2009032122 A | 2/2009 |
| WO | WO-2015102637 A1 | 7/2015 |

OTHER PUBLICATIONS

Extended European Search Report dated Oct. 10, 2017, from European Application 14876846.8; 15 pages.

JP Decision to Grant dated Nov. 11, 2017, from Japanese Application No. 2016-534931; 1 page—No translation available.

Krueger, Matthias, et al., "Active Contour Based Segmentation of 3D Surfaces," Oct. 12, 2008, Network and Parallel Computing; Springer International Publishing, 14 pages.

Memar, Sara, et al., "Object Detection Using Active Contour Model with Depth Clue," Jun. 27, 2013, Image Analysis and Recognition, Springer Berlin, Heidelberg, Berling, ISBJ 987-3-642-39093-7; 8 pages.

Soucy, M., et al., "A General Surface Approach to the Integration of a Set of Range Views," IEEE Transactions on Pattern Analysis and Machine Intelligence, IEEE Computer Society, USA, vol. 17, No. 4, Apr. 1, 1995; 15 pages.

Turk, Greg, et al, "Zippered polygon meshes from range images," SIGGRAPH 94 Conference Proceedings, Orlando, Florida, Jul. 24-29, 1994; 8 pages.

"ReconstructMe for Developers", [Online]. Retrieved from the Internet: <URL: http://reconstructme.net/reconstructme-sdk/>, (Accessed on: Jun. 13, 2016), 2 pgs.

Besl, P. J, et al., "A Method for Registration of 3-D Shapes", IEEE Transactions on Pattern Analysis and Machine Intelligence, 14 (2), (Feb. 1992), pp. 239-256.

Caselles, Vicent, et al., "Geodesic Active Contours", International Journal of Computer Vision 22(1), (1997), 61-79.

Cates, Joshua, et al., "GIST: An Interactive, GPU-Based Level Set Segmentation Tool for 3D Medical Images", Med Image Annual, 8(3), (Sep. 2004), 217-331.

Cui, Yan, et al., "3D Shape Scanning with a Time-of-Flight Camera", IEEE Conference on Computer Vision and Pattern Recognition (CVPR), (Jun. 2010), 1173-1180.

Curless, Brian, et al., "A Volumetric Method for Building Complex Models from Range Images", Proceedings of the 23rd annual conference on Computer graphics and interactive tehniques, (1996), 303-312.

Desburn, Mathieu, et al., "Implicit Fairing of Irregular Meshes using Diffusion and Curvature Flow", Proceedings of the 26th annual conference on Computer graphics and interactive techniques, (1999), 317-324.

Henry, Peter, et al., "RGB-D Mapping: Using Depth Cameras for Dense 3D Modeling of Indoor Environments", Experimental Robotics, Series No. 79, Springer Berlin Heidelberg, (2014), 477-491.

Jones, Mark W, et al., "3D Distance Fields: A Survey of Techniques and Applications", IEEE Trans Vis Comput Graph, 12(4), (2006), 581-599.

Krainin, Michael, et al., "Manipulator and Object Tracking for In-Hand 3D Object Modeling", Journal International Journal of Robotics Research, 30 (11), (Sep. 2011), 11311-1327.

Kutukakos, Kiriakos N, et al., "A Theory of Shape by Space Carving", The Proceedings of the Seventh IEEE International Conference on Computer Vision, vol. 1, (Sep. 1999), 307-314.

Laurentini, Aldo, "The Visual Hull Concept for Silhouette-Based Image Understanding", IEEE Transactions on Pattern Analysis and Machine Intelligence, 16(2), (Feb. 1994), 150-162.

Lefohn, Aaron E, et al., "Interactive, GPU-Based Level Sets for 3D Segmentation", Medical Image Computing and Computer-Assisted Intervention, (Nov. 2003), 564-572.

Lorensen, William E, et al., "Marching cubes: A high resolution 3D surface construction algorithm", Proceedings of the 14th annual conference on Computer graphics and interactive techniques, (1987), 163-169.

Newcombe, Richard A, et al., "Kinect Fusion: Real-Time Dense Surface Mapping and Tracking", Proceedings of the 10th IEEE International Symposium on Mixed and Augmented Reality, (2011), 127-136.

Pohl, Kilian M, et al., "Logarithm Odds Maps for Shape Representation", Med Image Comput Comput Assist Interv., 9(2), (2006), 955-963.

Pons, J.-P., "Maintaining the Point Correspondence in the Level Set Framework", Journal of Computational Physics, 220(1), (Dec. 2006), 339-354.

Roberts, Mike, et al., "A Work-Efficient GPU Algorithm for Level Set Segmentation", Proceedings of the Conference on High Performance Graphics, (2010), 123-132.

Rusu, Radu Bogdan, et al., "3D is here: Point Cloud Library (PCL)", IEEE International (Conference on Robotics and Automation (ICRA), (May 2011), 1-4.

Stegmaier, Simon, "A Simple and Flexible Volume Rendering Framework for Graphics-Hardware?based Raycasting", Fourth International Workshop on Volume Graphics, (Jun. 2005), 187-241.

Weise, Thibaut, et al., "In-hand Scanning with Online Loop Closure", IEEE 12th International Conference on Computer Vision Workshops (ICCV Workshops), (2009), 1630-1637.

Whitaker, Ross T, "A Level-Set Approach to 3D Reconstruction From Range Data", The International Journal of Computer Vision, 29(3), (Oct. 1998), 203-231.

Curless, "A Volumetric Method for Building Complex Models from Range Images", Aug. 23, 1996, 10 pages.

CN Office Action for CN Application No. 201480066335.1, Jan. 16, 2018, 11 pages.

First Office Action with Search Report from State Intellectual Property Office, P.R. China from Patent Application 201480066335.1 dated Apr. 6, 2017, English Translation only.

EPO Partial Search Report from European Application Serial No. 14876746.8 dated Jul. 7, 2017.

Curless, Brian, et al., "A volumetric method for building complex models from range images," Computer Graphics Proceedings. SIGGRAPH '96, ACM New York, Aug. 1, 1996.

Bylow, et al., "Real-Time Camera Tracking and 3D Reconstruction Using Signed Distance Functions," Robotics: Science and Systems (RSS), Online Proceedings, vol. 9, Jan. 1, 2013.

"3D reconstruction from multiple images", Wikipedia, [Online]. Retrieved from the Internet: <URL: http://en.wikipedia.org/wiki/3D_reconstruction_from_multiple_images>, (Accessed Apr. 22, 2014), 6 pgs.

"Handheld Augmented Reality", [Online]. Retrieved from the Internet: <URL: http://handheldar.icg.tugraz.at/>, (Accessed Apr. 22, 2014), 1 pg.

(56) References Cited

OTHER PUBLICATIONS

"International Application Serial No. PCT/US2014/010151, International Search Report dated Oct. 22, 2014", 3 pgs.
"International Application Serial No. PCT/US2014/010151, Written Opinion dated Oct. 22, 2014", 4 pgs.
Moons, Theo, et al., "3D Reconstruction from Multiple Images Part 1: Principles", Foundations and Trends in Computer Graphics and Vision 4(4), (Apr. 2010), 287-404.
Nießner, Matthias, et al., "Real-time 3D Reconstruction at Scale using Voxel Hashing", ACM Transactions on Graphics (TOG), vol. 32, Issue 6, (Nov. 2013).
Prakoonwit, Simant, et al., "3D surface reconstruction from multiview photographic images using 2D edge contours", 3D Research, 3(4), (Dec. 2012), 1-12.
State Intellectual Property Office People's Republic China, Search Report for CN Application CN 201480066335.1, dated Jul. 17, 2018, 2 pages.
State Intellectual Property Office People's Republic China, Third Office Action for CN Application CN 201480066335.1, dated Jul. 25, 2018, 3 pages.

\* cited by examiner

REAL-TIME 3D RECONSTRUCTION WITH A DEPTH CAMERA

CROSS-REFERENCE TO RELATED APPLICATION

This application is a U.S. National Stage Filing under 35 U.S.C. 371 from International Application No. PCT/US2014/010151, filed on 3 Jan. 2014, and published as WO 2015/102637 on Jul. 9, 2015, which application is incorporated herein by reference in its entirety.

TECHNICAL FIELD

Embodiments described herein generally relate constructing a three-dimensional (3D) model from digital images and more specifically to real-time 3D reconstruction with a depth camera.

BACKGROUND 3D modeling (e.g., reconstruction) of a target (e.g., object of interest) from image data is a popular computer vision topic. In creating a 3D model of the target from image data, a popular usage (user experience) is to hold the camera in hand and move the camera around the target while displaying to the user a 3D model of the object in real-time and the current camera pose relative to the object. Alternatively, the camera may be held stationary and a turntable may be used to rotate the object. In either scenario, different facets of the target are exposed to the camera in order to gather information to create the 3D model.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
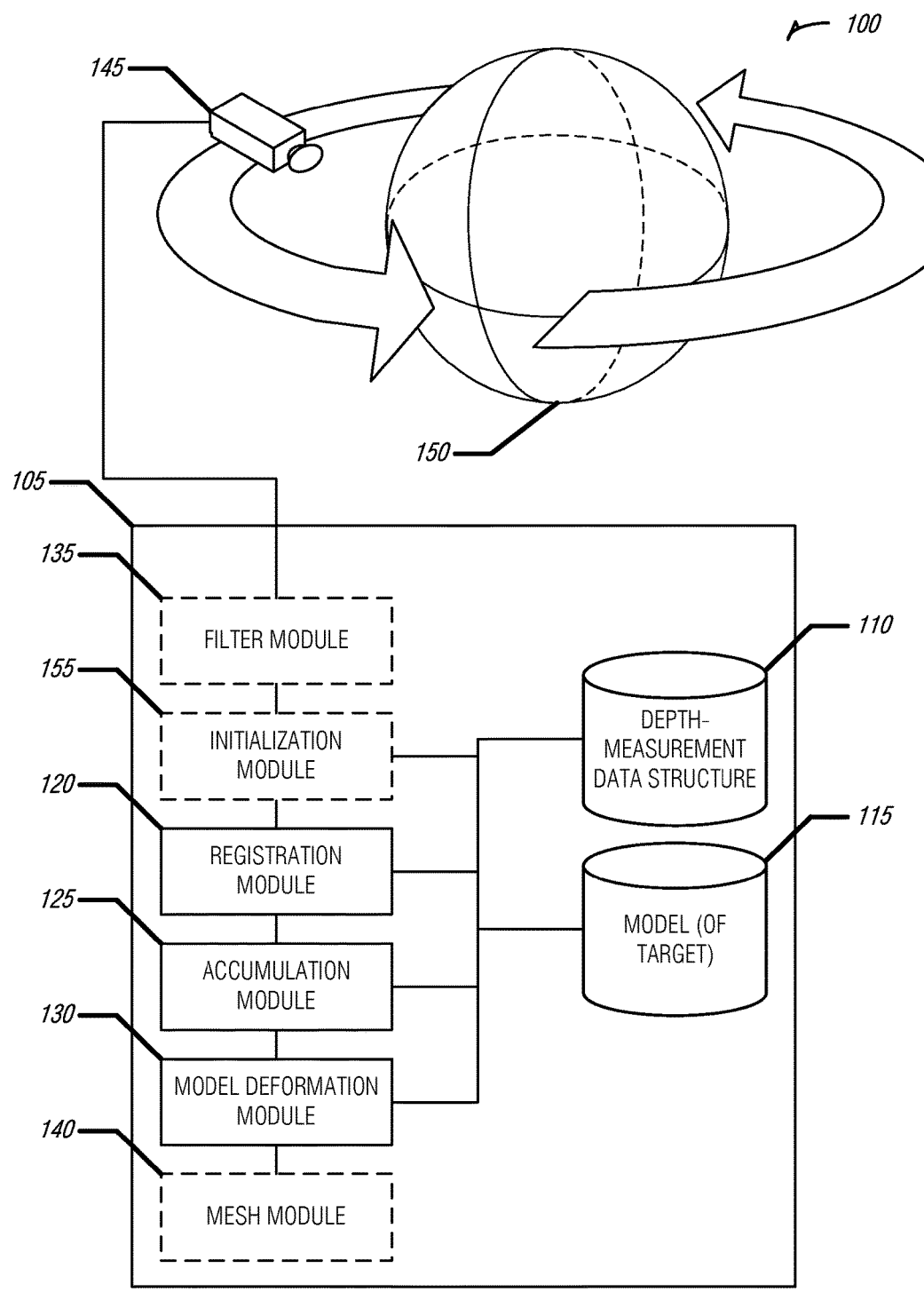
FIG. 1 is a block diagram of an example of a system including an apparatus for real-time 3D reconstruction with a depth camera, according to an embodiment.

In an example, a 3D modeling of a target from a depth camera may use a "bottom-up" approach. In a bottom-up approach, depth images are captured, registered to current data, and accumulated to build a model. A disadvantage to this approach is that the computational domain must include everything in the camera's field of view, even though the object of interest may occupy only a fraction of the camera's field of view. There is the potential to gradually reduce the computational domain by ruling out regions of space that do not contain the object. Reducing the computational domains translates into significant speed-up in 3D reconstruction as more camera data is captured.

Another disadvantage is the lack of a closed surface in the model for incomplete depth data without further post processing. That is, because the bottom-up approach essentially places a piece of the model at the end of a depth measurement, wherever depth measurements are missing, no such piece of the model was placed. This may lead to holes (e.g., missing parts) in the model's surface, making it an open surface without an interior/exterior assignment. For example, a depth camera rotating about the equator of a sphere with depressions at its poles will not get depth measurements for the depressions. Thus, a bottom-up approach will not put pieces in those depressions for the model. Such holes in the surface may become a problem in a variety of applications (e.g. 3D printing) which require the surface to be closed.

To address the shortcomings of bottom-up 3D modeling of a target object, a top-down 3D modeling approach may be used. In the top-down approach, the model is not assembled, piece by piece, but is rather carved from an initialized form. For example, each depth measurement may be thought of as a cutting laser applied to a 3D shape (e.g., a block of wood) large enough to encompass the target. The portions of the shape touched by the laser are removed. Because the model is represented as a solid mass, at all times it maintains a closed surface.

The approach described herein maintains separate data structures for the accumulated depth measurements and the carved model, and can be thought of as both bottom-up and top-down reconstruction. The model may be maintained as a signed distance field. Such a model representation permits valuable computational savings in, for example, depth image registration. Further, maintenance of the model as a signed distance field reduces computational complexity to determine whether a point is inside the model, outside the model, or even how near the point is to a boundary (e.g., surface) of the model. Depth measurements are stored as a running weighted average of signed distance fields; however, because signed distance fields do not form a linear vector space—i.e., linear combinations of signed distance fields are not necessarily signed distance fields—accumulated depth and model representations are maintained separately.

The top-down approach may be contrasted with the bottom-up approach using the previous dimpled sphere example. Whereas as the bottom-up approach left the model surface at the depressed poles incomplete, the top-down approach would remove the model material from over the poles, creating a "filled in" effect. However, the sphere's surface would be complete. In another example contrast, a spurious object passing through empty space near a target would be ignored in the top-down approach because there is no model "material" to leave (e.g., it was already removed) to represent the object. In contrast, a bottom-up approach would need additional processing to determine the spurious nature of the object and refrain from adding its depth data to the model.

FIG. 1 is a block diagram of an example of a system 100 including an apparatus 105 for top-down real-time 3D modeling with a depth camera 145, according to an embodiment. As illustrated, the depth camera 145 rotates about the target 150 to capture depth images. However, as noted above, the target 150 may be placed on a turntable (or similar device) and rotated while the depth camera 145 remains stationary. In these examples, the depth camera 145 captures depth images from the outside of the target. In an example, the depth camera 145 may be placed within a target (e.g., a room, open space, inside a hollow sphere, etc.) and moved in order to gather depth images of the interior. In this example, the principles laid out herein still apply; however, a different model initialization form may be used. For example, a large cube may encompass an entire room from within which the model is carved out. In such examples, a flag may be set in order to provide orientation to a variety of techniques discussed herein, such as where the model boundary lies.

The apparatus 105 may include a number of components, including a depth-measurement data structure 110 (e.g., stored on a machine-readable medium), a model 115 (of the target 150 and, e.g., stored on a machine readable medium), a registration module 120, an accumulation module 125, and a model deformation module 130. The apparatus 105 may also optionally include one or more of a filter module 135, and initialization module 155, or a mesh module 140. All of the modules are implemented in hardware, as described below with respect to FIG. 8.

The depth-measurement data structure 110 may be configured (e.g., arranged) to store depth measurements received from the depth camera 145 of the target 150. In an example, the depth-measurement data structure 110 is a voxel grid corresponding to points in space encompassing the target 150. In an example, the depth-measurement data structure voxel grid is equivalent (e.g., a different grid with the same attributes) as the model's voxel grid.

The model 115 may be configured to store a three-dimensional representation of the target 150. In an example, the model 115 is a voxel grid corresponding to points in space encompassing the target 150.

The registration module 120 may be configured to register a current depth image to the model 115 received from the depth camera 145. Registration generally entails determining the pose of a camera when an image is captured. The value of this operation is clear when one considers a first image captured whilst the camera pose points towards the front of an object and a second image whilst the pose is directed to the back of the object. In order to avoid costly depth camera 145 control (e.g., stepping motors or other sensors to provide registration data), a depth image may be compared against the model 115 in order to determine the depth camera's pose in relation to the target 150.

Figure 5:
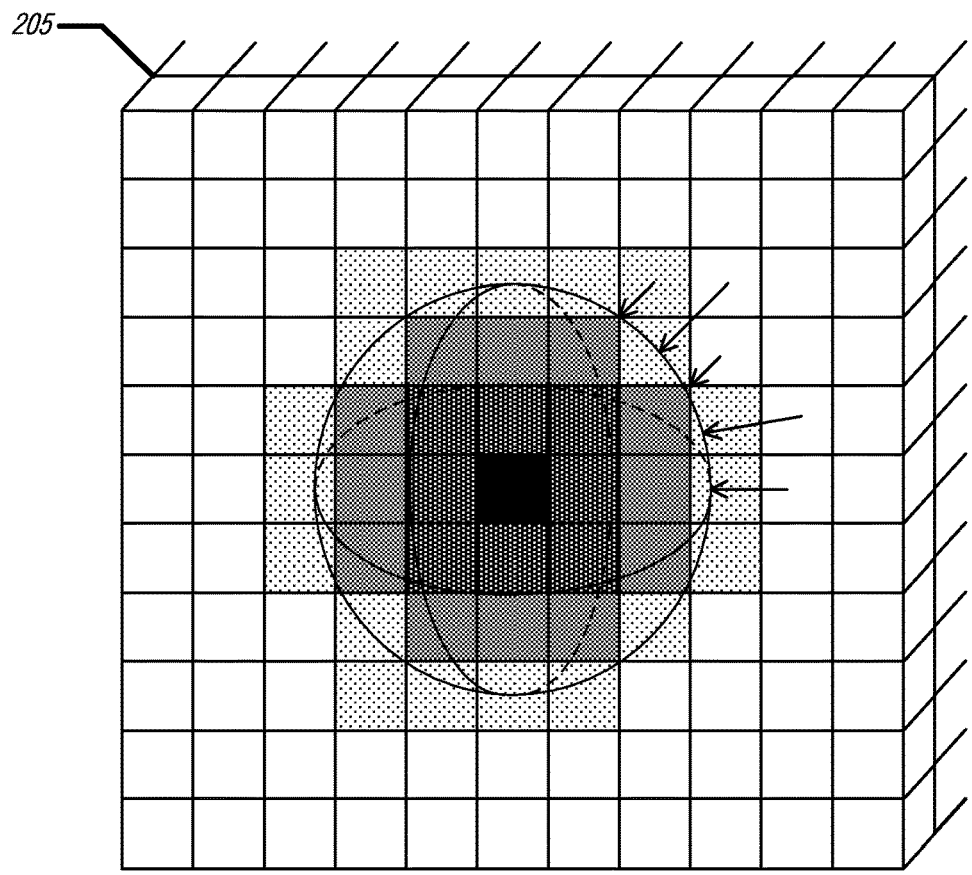
FIG. 5 illustrates an example of an extended signed distance field of a model with gradients on a voxel grid, according to an embodiment.

In an example, registering the depth image to the model 115 may include the registration module 120 configured to select a voxel in the model 115. The signed distance field of the model 115 may be extended into surrounding space of a current voxel and a gradient for the current voxel may be computed. FIG. 5 illustrates the extension and computation of gradients. The registration module 120 may also be configured to compute a correspondence point on a boundary of the target 150 in the model 115 that corresponds to the current voxel along the gradient. That is, the gradient may be used to trace a line from the extended point back to a surface point in the model 115. The correspondence point may then be stored. In an example, the registration module 120 may be configured to iteratively select the voxel, extend the signed distance field, compute the gradient, compute the correspondence point, and store the correspondence point for a plurality of voxels in the model 115. In an example, the plurality of voxels may be selected such that they are near the boundary of the target 150 in the model 115. Such a selection reduces the number of correspondence points that are calculated and thus increases computational efficiency of the registration. However, the reduced number of points that may be used, for example, in the Iterative Closest Point (ICP) algorithm may impact the accuracy of the registration. Thus, in an example, the selection of voxels near the surface may be limited to examples when the depth camera's pose change from one depth image to another is small. In an example, the change is limited to 32 millimeters or less.

In an example, the registration module 120 may be configured to correlate a set of stored correspondence points to a 3D point from the current depth image. The registration module 120 may use the set of stored correspondence points to determine rigid motion of the depth camera 145 from a first pose. The rigid motion from the first pose may be used to determine a second pose of the depth camera 145. This may be accomplished using the ICP technique, for example. Because ICP spends most of its computational time in determining corresponding points, the use of stored correspondence points calculated from the extended signed depth field enhances the ability of ICP to work on limited hardware or in limited time.

Below is an example operative scenario of the registration module 120. After model initialization, based on the first depth image, subsequent images may be registered to the current model estimate. The ICP approach to 3D registration is to identify corresponding closest points $p_n$ and $p'_n$ on the source (e.g., from the current depth image) and target (e.g., the model 115) surfaces and solve for the rigid motion $M_k$ between them (i.e. $p' \approx M_k p$). After applying $M_k$ to the source mesh, corresponding closest-points may change. Accordingly, re-estimation of the rigid rotation may be performed. The ICP algorithm alternates between estimating rigid motion and transforming point sets until convergence. As noted above, most of the computation time is spent in computing closest points. Although spatial lookup data structures (e.g., KD-Trees) may be used to find point correspondences an alternative approach may provide greater efficiency in determining point correspondences while leveraging parallelism common in today's processing hardware.

For each voxel in the level set image of the model 115, the signed distance field for the current model may be extended into the surrounding space via $\varphi(\bullet) \leftarrow \Phi\{\varphi\}(\bullet)$. Further, for each voxel in the extended image, the gradient of the model's level set may be computed and a streamline may then be traced from the current voxel location back to the target's boundary in the model 115 with the following fixed-point iterative scheme:

$$X^{\tau+1} = X^\tau - \lambda \varphi(X^\tau) \nabla \varphi(X^\tau)$$

which converges to a point X*. Following this, iterative scheme, for every voxel X in the space around the target 150 in the model 115, a corresponding closest point X* on the model has been determined. These corresponding points may be solved for independently. Thus, the computational complexity of the corresponding points determination is $O(M^3/P)$ when considering $M^3$ voxels and P processing units. However, as noted above, if the rigid motion is small, then the closest points computation may be limited to being near the surface of the target 150 in the model 115. In this example, the computational complexity is further reduced to $O(M^2/P)$.

The following pseudo code illustrates an example of a complete 3D registration pipeline:

```
Register(k):: //register depth image k to model 115
    If (k mod K = 0) // every K5th frame
        φ(•) ← Φ{φ}(•) // rebuild distance field near portion of model's
            surface that is changing
        g⃗ = ∇φ // compute gradient of distance field
        foreach X ∈ D
            X⁰ = X
            do
                X^(t+1) = X^t − λφ(X^t)∇φ(X^t) // solve for point
                    correspondence
            while (‖X^(t+1) − X^t‖ > δ_a)
                η(X) = X^(t+1) // store point correspondence
        end
    end
    M_k = M_(k−1) // guess current pose
    ε = ∞ // initialize current registration error
    ε' = 0 // initialize last registration error
    while (|ε − ε'| > δ_b|D[k]|)
        n = 1
        ε' = ε
        ε = 0
        foreach x_k ∈ D[k]
            p_n = M_k I_k^D (x_k) // compute 3D point for depth image
                pixels
            p_n' ← η(p_n) // compute sets of corresponding points
            ε ← ε + ‖p_n − p_n'‖ //accumulate registration error
            n ← n + 1
        end
        M_k = ICP(P_n, P_n') // solve for rigid motion
    end
end
```

This variant of ICP enables fast correspondence calculations, parallelizes well, and has a fixed memory footprint.

The accumulation module 125 may be configured to modify the depth-measurement data structure 110 with the current depth image based its registration. For example, the accumulation module 125 updates the depth-measurement data structure 110 with new depth data from the current depth image. In an example, to modify the depth-measurement data structure 110, the accumulation module 125 may be configured to weight a point in the current depth image based on an angle of a ray traced from a focal point of the depth camera 145 to the point. The focal point and the angle may be determined based on a pose of the depth camera 145. The pose may be determined from the registration of the current depth image. In an example, the weighting may be lower (e.g., a lower weight is assigned) when the angle approaches 90 degrees (e.g., the ray is orthogonal to depth camera's view or the point lies along the object's silhouette 145).

In an example, the accumulation module 125 may combine the weight with a previous weight for the same point. In an example, the combination may be an average of the weights for the point. In an example, the accumulation module 125 may combine the weights of a plurality of points (e.g., respectively combine weights calculated for the respective points). In an example, the accumulation module 125 may be configured to also accumulate color information for the point. For example, the depth camera 145 may also be capable of capturing visible spectrum light (e.g., red-green-blue (RGB)) while capturing a depth image.

Below is an example operative scenario of the accumulation module 125. Depth measurements may be accumulated in a voxel grid (e.g., in the depth-measurement data structure 110) at the same grid resolution as the model's level set. An envelope of the current depth image $\varphi_E(X)$ may be computed along with weights via:

$$W_D(X) = \begin{cases} \max(-\vec{r}_k(X) \cdot \nabla \Phi\{\varphi_E\}(X), 0) I_k^D(\pi_k(X)), & |\Phi\{\varphi_E\}(X)| \leq d_E \\ 0, & \text{otherwise} \end{cases}$$

where $\vec{r}_k(X)$ is the direction of a ray traced from the depth camera's focal point through X. Higher confidence may be assigned to portion of the depth map orthogonal to the camera's view by weighting depth measurements with the dot product between the depth camera 145 and $\varphi_E$. The threshold $d_E$ helps to mitigate noise. That is, $d_E$ operates to limit the support of depth images to within $\pm d_E$. Thus, any depth measurement closer than $d_E$ will be treated as art of the same surface and averaged together. The selection of $d_E$ is up to a user, however, generally, $d_E$ should be chosen large enough to account for variation in surface location due to noise, but small enough to capture fine details in the data.

Depth measurements $\varphi_E$ may be accumulated to a depth buffer $\varphi_D$ (e.g., in the depth-measurement data structure 110) and weights $W_D$ via:

$$\varphi_D \leftarrow \frac{W_D \varphi_D + w_D \varphi_E}{W_D + w_D}$$

and $$W_D \leftarrow W_D + w_d$$

where $\varphi_D$ and $W_D$ are initialized to zero everywhere and the accumulated weight is limited to $W_{max}$.

The following pseudo code illustrates an example of an accumulation pipeline for both depth and color:

```
Accumulate (k):: // accumulate depth for depth image k
    foreach X ∈ D
        if W_D(X) > W_max w_D(X) =
                { max(-r⃗_k(X)·∇φ_E(X), 0)I_k^D(π_k(X)),   |φ_E| ≤ d_E
                { 0,                                          otherwise φ_D(X) ← (W_D(X)φ_D(X) + w_D(X)φ_E(X)) / (W_D(X) + w_D(X)),  W_D(X) ← W_D(X) + w_d(X)

end
        if W_C (X) < W_max w_C(X) =
                { max(-r⃗_k(X)·∇φ_E(X), 0)I_k^C(π_k(X)),   |φ_E| ≤ d_E
                { 0,                                          otherwise φ_C(X) ← (W_C(X)φ_C(X) + w_C(X)I_k^C(π_k(X))) / (W_C(X) + w_C(X))
            W_C(X) ← W_C(X) + w_C(X)

end
    end
end
```

In this example, a separate accumulation buffer is used for color data because mapping between the depth image and corresponding color image may be unreliable (e.g., near the target's silhouette). As illustrated, the color data is "eroded" or thresholded to remove unreliable color measurements.

Color may be accumulated and weighted similarly to the accumulation and weighting of the depth data.

The model deformation module 130 may be configured to deform the model 115 based on space carving and the modified depth-measurement data structure 110. In an example, the space carving may include the model deformation module 130 to be configured to intersect the current depth image with the model 115. Such space carving may be performed as described below with respect to the initialization module 155. Such space carving is an efficient mechanism for large changes in shape but may create sharp edge discontinuities along the target's silhouette. Further, it may exhibit a bias to the current depth image because it does not account for previous depth images at different poses of the depth camera 145.

In an example, the model deformation module 130 may be configured to calculate a surface that approximates the model 115 using the modified depth-measurement data structure 110. The approximation may be based on a bounded iterative process to fit the surface to the modified depth-measurement data structure 110. By calculating the surface, the issues identified above with respect to the carve-out may be mitigated. In an example, to calculate the surface, the deformation module 130 may be configured to use active contour segmentation. The active contour segmentation may use a level set evolution technique on voxels in the depth-measurement data structure 110. In an example, the active contour technique may be restricted to maintain the model 115 as a signed distance field. In an example, the bound iterative process may be restricted to voxels that are near the boundary of the target 150 in the model 115.

In an example, the level set evolution may be formulated as minimizing the following objective function:

$$E(\varphi, \varphi_D, W_D) = \int \left( \frac{1}{2}\varphi_D^2(X) + \lambda \|\nabla \varphi(X, t)\| \right) I_W^D(X) \delta(\varphi(X)) dX$$

where $\lambda$ is a regularization weight, $\delta(x)$ is a compactly supported approximation to the Dirac delta, and $I_W^D(X)$ is 1 if $W_D(X) > 0$ and 0 otherwise. The following partial differential equation (PDE) is derived by solving the Euler-Lagrange equations when $\varphi$ is re-expressed as a function of time:

$$\frac{\partial \varphi(X, t)}{\partial t} = I_W^D(X) \delta(\varphi(X, t)) \left[ \varphi_D(X) + \lambda \nabla \cdot \frac{\nabla \varphi(X, t)}{\|\nabla \varphi(X, t)\|} \right] \|\nabla \varphi(X, t)\|$$

A first order solution to this PDE includes the following iterative technique:

$$\varphi(X, t+1) = \varphi(X, t) + \Delta t \rho(X, t)$$

where $$\rho(X, t) = I_W^D(X) \delta(\varphi(X)) \left[ \varphi_D(X) + \lambda \nabla \cdot \frac{\nabla \varphi(X, t)}{\|\nabla \varphi(X, t)\|} \right] \|\nabla \varphi(X, t)\|$$

Again, the iterative technique may be restricted such that $\varphi$ is always a signed distance field. In an example, the iterations per time frame (e.g., L) may be restricted to 1 (e.g., because most of the model's deformation is handled by the space carving).

The following pseudo code illustrates an example of a deformation pipeline:

```
Deform(k):: // deform model 115 for a time frame
    foreach X ∈ D
        φ(X) ← max(Φ{φ_E}(X) − τ, φ(X)) // space carve
    end
    for l = 1: L evolve the level set of the model 115 for L iterations
        ω = Φ{φ_E}(·) // rebuild signed distance field
        foreach X ∈ D ρ(X, t) =

I_W^D(X)δ(φ(X)) [φ_D(X) + λ∇ · (∇φ(X, t)/‖∇φ(X, t)‖)] ‖∇φ(X, t)‖

φ(X) ← φ(X) + Δtρ(X) // evolve level set end
    end
end
```

The filter module 135 may be configured to process the current depth image to at least one of fill holes in the depth data of the current depth image or reduce noise in the current depth image. In an example, the filter module is disposed in a depth image pipeline between the depth camera 145 and any or all of the registration module 120, the accumulation module 125, the model deformation module 130, or the mesh module 140.

The initialization module 155 may be configured to deform the model 115 from an initialized form based on a first depth image (e.g., received from the filter module 135). In an example, the initialized form of the model 115 may be created based on user input. For example, the initialization module 155 may include a user interface that permits a view of the target 150 through the depth camera 145. The user interface may be configured to permit the user to specify a bounding shape, on the display, to encompass the target 150 in the view. This bounding shape may form the basis for the initialized form of the model 115. In an example, the initialized form of the depth model is a cube (e.g., such as those shown below with respect to FIGS. 2-5).

Below is an example operative scenario of the initialization module 155. A region of interest may be established as a 3D bounding box (e.g., a cube). An isotropic voxel grid may be overlaid and mapped onto the region of interest. For example, mapping f: B ↦ D may be applied; where B is the bounding box (e.g., in millimeters) and D is the voxel grid in voxel units. Maintaining a level set representation of the model 115 (e.g., used to create the signed distance field of the model) enables sub voxel precision below grid resolution because the individual voxel values both indicate the distance and direction a given measurement is from a target boundary in the model 115.

Figure 2:
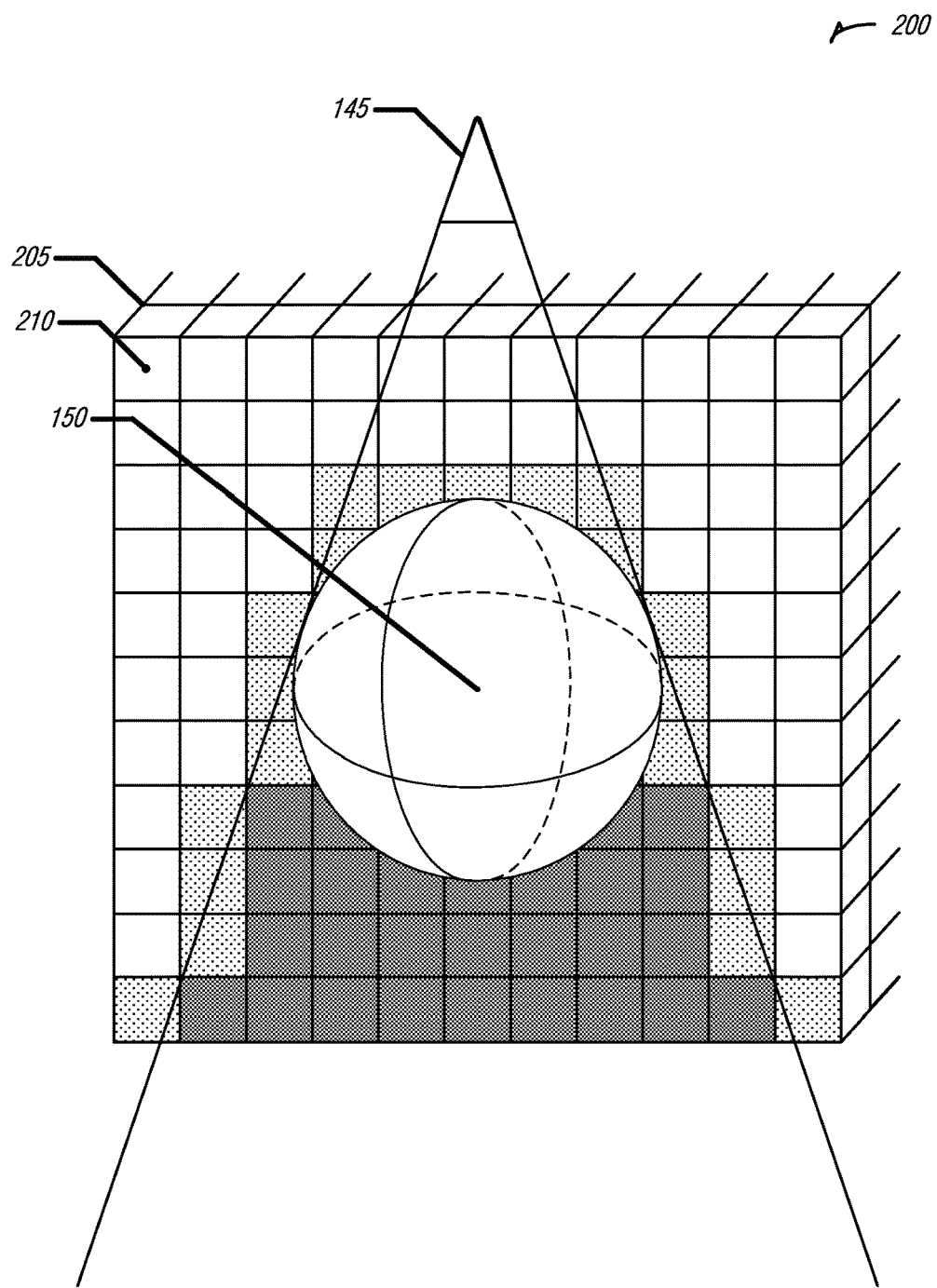
FIG. 2 illustrates an example of a voxel grid of a model, a depth camera, and a target, according to an embodiment.

When depth image acquisition has begun, an assumption (e.g., no processing is made to check) is made that the target 150 is within the 3D bounding box (and thus the model 115). The first depth image may be used to carve out of the model 115 regions not part of the target 150. This may be accomplished by back-projecting (e.g., as illustrated in FIG. 2) the depth map and target's silhouette. Thus, given an initial level set representation of the model of $\varphi = -\infty$, the envelope of the depth image may be computed by:

$$\varphi_E(X) = \Delta X_Z I_0^D(\pi_0(X)) + (1 - I_0^D(\pi_0(X))) \infty$$

where $\Delta X_Z$ is the z component of the difference between a point on the depth image and the current voxel location $\Delta X = (I_k^D(\pi_k(X)) - f^{-1}(X))$. The indicator function $I_k^D(x_k)$ may set $\varphi_E$ to infinity at locations where there is no depth data or areas outside of the bounding box. The resulting image $\varphi_E$ (e.g., the shaded regions of FIG. 2 or 3) is a level set whose zero iso-level corresponds to the envelope of the depth image. This may also be expressed as the boundary (e.g., surface) of the target 150 in the model 115 is the set of points $\{X|\varphi_E(X)=0, \forall X \in D\}$. At this junction, however, $\Phi_E$ is not necessarily a signed distance field. Accordingly, the operator $\Phi\{\cdot\}(X)$ may be applied to the $\varphi_E$ level set to make it a signed distance field. In an example, an approximation to the signed distance field.

The envelope's signed distance field may now be intersected with the current model 115 via $$\varphi(X) \leftarrow \max(\Phi\{\varphi_E\}(X), \varphi(X))$$

In an example, to mitigate holes in the depth image, the envelope may be dilated by a number of voxels (e.g., $\tau=2$) prior to merging it with the current model 115. This may be expressed as $$\varphi(X) \leftarrow \max(\Phi\{\varphi_E\}(X) - \tau, \varphi(X))$$

This dilation may be performed by the filter module 135. In an example, such as that shown below in FIG. 3, multiple initial depth images may be acquired (e.g., from multiple cameras). The above process is repeated with the multiple views.

The mesh module 140 may be configured to convert the model 115 into a triangle mesh. Triangle meshes are widely used to process 3D models. In an example, the Marching Cubes technique may be used to perform the conversion. In the examples where the model 115 is a level set, the generated mesh will be a contiguous (e.g., watertight) surface. In an example, a smoothing technique may be applied to the generated mesh. For example, Marching Cubes surfaces may include slivers or sharp edges near voxel boundaries that may be smoothed. In an example, the smoothing technique is an implicit Laplacian smoothing technique with uniform weights to, for example, regularize triangle size and shape. Thus, a mesh comprising vertices $(x_n, y_n, z_n)$ may be represented with vectors $V_x = [x_1, \ldots, x_n]^T$, $V_y = [y_1, \ldots, y_n]^T$, and $V_z = [z_1, \ldots, z_n]^T$. The mesh thus represented may be smoothed using the following iterative technique: $(I - \alpha dt L) V_x^{t+1} = V_x^t$, where I is an N×N identity matrix, $\alpha$ is a regularization weight, and L is the Laplacian umbrella operator:

$$L_{i,j} = \begin{cases} 1, & i = j \\ -1/|N(i)|, & j \in N(i) \\ 0, & \text{otherwise} \end{cases}$$

where N(i) is the set of neighboring vertices for vertex i, and |N(i)| is the number of vertex neighbors. The process is respectively and independently repeated for the $V_x$ and $V_y$ components.

The above technique regularizes the size and shape of the triangles in the mesh, but may move vertices slightly from the boundary of the target 150 in the model 115. To correct this, mesh vertices may be projected onto the accumulated depth data $\varphi_D$ by replacing them with the closest corresponding points on the model 115 via the following iterative technique:

$$X^{t+1} = X^t - \lambda \varphi_D(X^t) \nabla \varphi_D(X^t)$$

Color may be added to the model 115 by linearly interpolating the accumulated color buffer $\varphi_C$ at mesh vertices. In an example, where color data is lacking (e.g., a weight of zero) for a region of space, the region may be assigned an alpha value of zero (e.g., invisible) or filled with a background in the color space.

FIG. 2 illustrates an example 200 of a voxel grid 205 of a model, a depth camera 145, and a target 150, according to an embodiment. A voxel 210 is a point oriented in 3D space. However, for clarity, the voxels are not generally shown, but rather a bounding box containing a voxel 210 at its center. The voxel grid 205 extends into all three dimensions, however, for clarity, the top-down carving approach is illustrated in two dimensions. For example, the voxel grid 205 is mapped to real-space (e.g., as seen through the camera 145) around the target 150. Prior to the cutting, every square may be darkly shaded (representing inclusion into the model). After a depth image (e.g., a first depth image) is taken, the square is removed from the model (indicated by no shading). In an example, the model's boundary may also be noted (indicated by a light shading) where, for example, other refinements may be performed.

Figure 3:
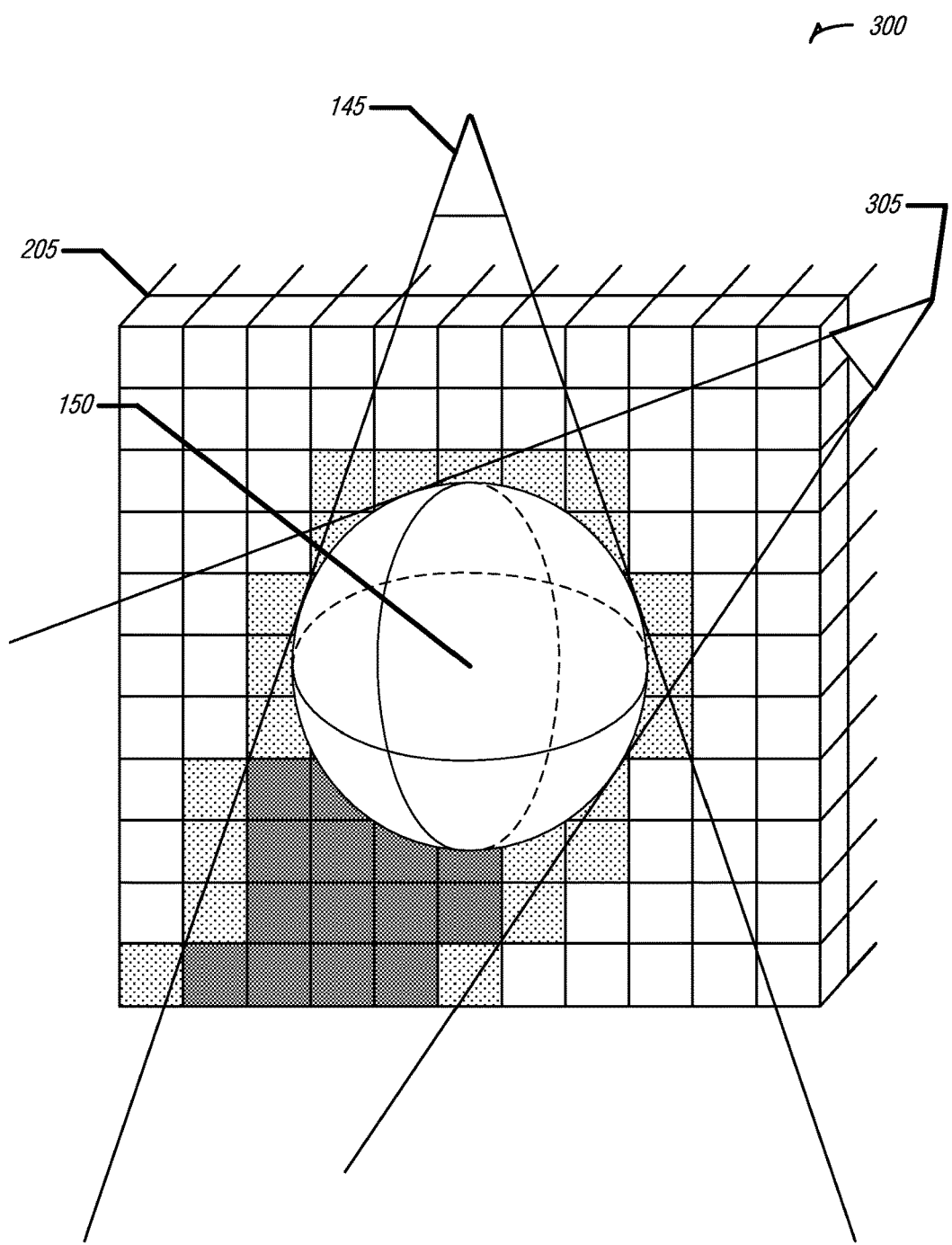
FIG. 3 illustrates an example of a voxel grid of a model, a plurality of depth cameras, and a target, according to an embodiment.

FIG. 3 illustrates an example 300 of a voxel grid 205 of a model, a plurality of depth cameras (e.g., depth camera 145 and depth camera 305), and a target 150, according to an embodiment. FIG. 3 is essentially the same as FIG. 2 with the addition of the second camera 305. The simultaneous use of several cameras may allow scans to be completed more quickly. Further, the space carving approach does not require storing the multi camera data (e.g., as used in some visual hull reconstructions), because each simply modifies the voxels making up the model.

Figure 4:
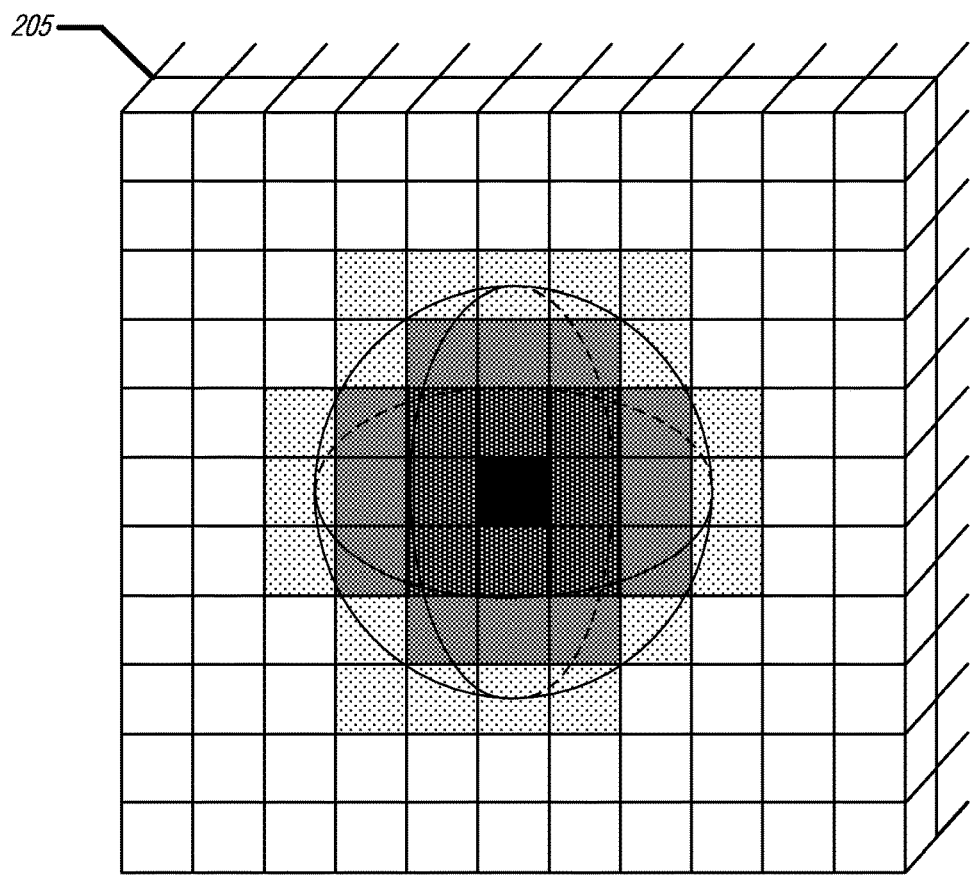
FIG. 4 illustrates an example of a signed distance field of a model on a voxel grid, according to an embodiment.

FIG. 4 illustrates an example 400 of a signed distance field of a model on a voxel grid 205, according to an embodiment. FIG. 4 provides a visual example of a signed distance field. As illustrated, the darker the shading of a square, the greater the value of the voxel in the square. White shading is negative and represents a point outside of the model. The magnitude (not indicated) of the white shaded squares represents a point's distance from the model's boundary. The lightest non-white shaded squares represent a value of zero and indicate the model's boundary.

Because a point's value in a signed distance field indicates all of whether the point is within the model (e.g., a negative value), on the model's boundary (e.g., a zero value or within a predefined range from zero), or out of the model (e.g., a positive value), it is an efficient way to store this information. Further, the magnitude of the value indicates how far away from the model's boundary the point is. This allows for convenient determinations of point "nearness" to the boundary. Further, gradients may be easily determined by "following" a path of highest value (e.g., a neighboring point that is greater-than-or-equal-to other neighboring points).

FIG. 5 illustrates an example 500 of an extended signed distance field of a model with gradients on a voxel grid 205, according to an embodiment. The expansion of the signed distance field is represented by the non-arrow end of the lines and the gradient by the orientation of the lines in the direction of the arrow. As discussed above, the signed distance field helps such determinations. Further, the expansion of the depth field and the gradient also illustrates the point correspondence to a boundary point that may be used in the efficient ICP implementation described above with respect to FIG. 1.

Figure 6:
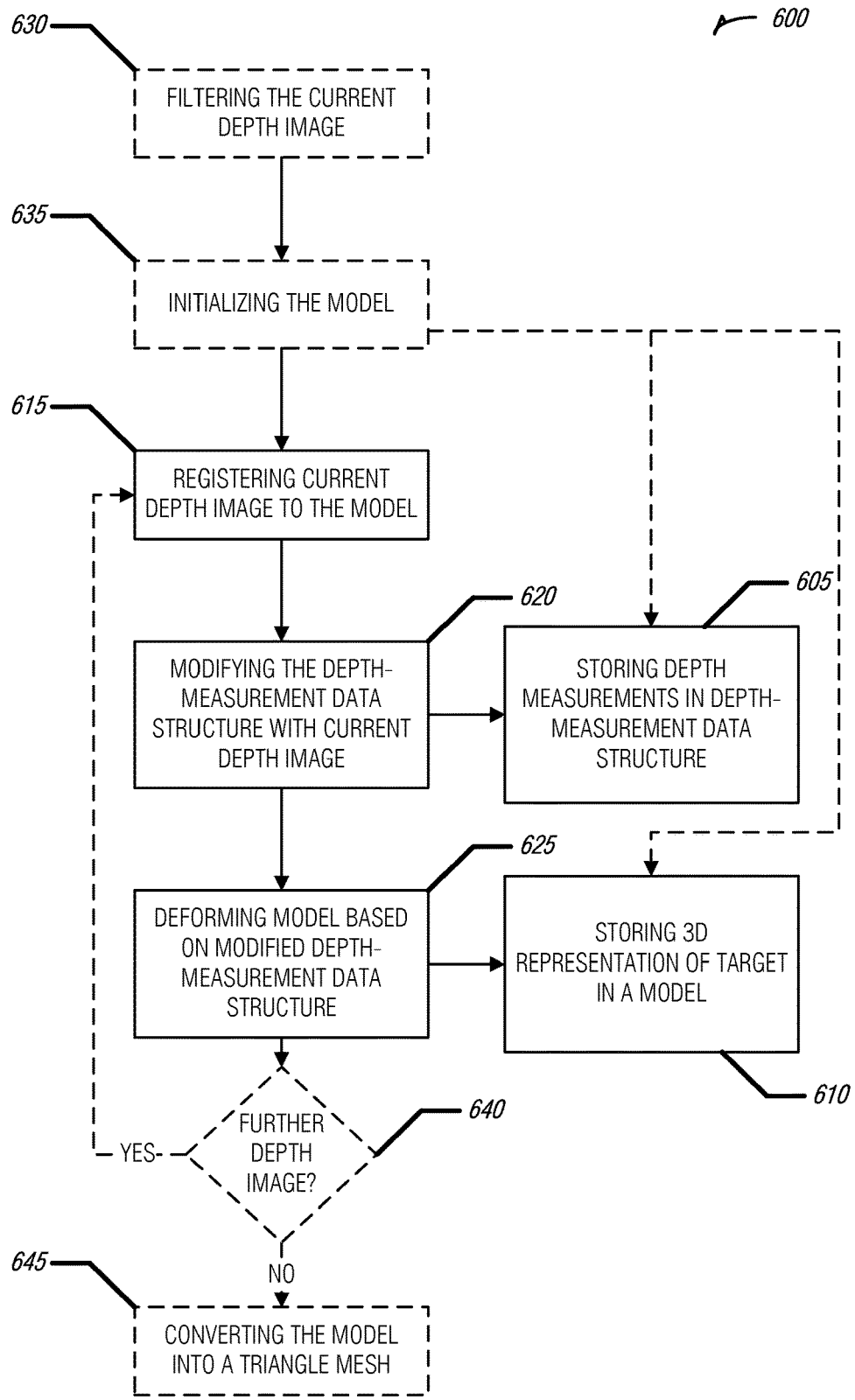
FIG. 6 illustrates a flow diagram of an example of a method for real-time 3D reconstruction with a depth camera, according to an embodiment.

FIG. 6 illustrates a flow diagram of an example of a method 600 for top-down real-time 3D modeling with a depth camera, according to an embodiment. The operations of the method 600 are all performed using machine hardware, such as that described above.

At operation 605, depth measurements received from a depth camera of a target may be stored in a depth-measurement data structure. In an example, the depth-measurement data structure may be a voxel grid where voxels in the grid correspond to points in space encompassing the target.

At operation 610, a three-dimensional representation of the target may be stored in a model. In an example, the model may be a voxel grid where voxels in the grid correspond to points in space encompassing the target. In an example, the model includes a signed distance field. Accordingly, the model may be represented by a signed distance field with the $\Omega$ set being the model's boundary and positive values being within the boundary.

At operation 615, a current depth image may be registered to the model, where the current depth image being received from the depth camera. In an example, registering the current depth image to the model may include additional operations of: selecting a voxel in the model; extending the signed distance field of the model for the selected voxel into surrounding space to a current voxel; computing a gradient for the current voxel; computing a correspondence point on a boundary of the model that corresponds to the current voxel along the gradient; and storing the correspondence point. In an example, these additional operations may be performed for a plurality (e.g., all) of voxels in the model. In an example, the plurality of voxels may be limited to voxels near the boundary of the target in the model. Nearness may be determined by a voxel having a magnitude (e.g., absolute value of its signed distance field representation) below a predetermined value. In an example, nearness includes voxels that are at least as close to the boundary as any other voxel.

In an example, registering the current depth image to the model may include correlating a set of stored correspondence points to a three-dimensional point from the current depth image (e.g., where the stored correspondence point in the set of stored correspondence points). Rigid motion of the camera may be determined from a first pose using the set of stored correspondence points. A second pose of the depth camera may be determined using the rigid motion from the first pose. In this example, the second pose corresponds to a pose of the depth camera in relation to the target. The modifying may also include combining the weight with a previous weight for the same point. This may be known as accumulating the depth image data. In an example, color data may also be accumulated (e.g., for each point) from color data received (e.g., from the depth camera or another camera synchronized to the depth camera pose). In an example, the accumulation is performed for a plurality (e.g., all) points in the current depth image.

At operation 620, the depth-measurement data structure may be modified with the current depth image based on the registration. In an example, the modifying may include weighting a point in the current depth image based on an angle of a ray traced from a focal point of the depth camera to the point. The focal point and the angle may be determined based on a pose of the depth camera determined from the registration of the current depth image At operation 625, the model may be deformed based on space carving and the modified depth-measurement data structure. The space carving is performed with the current depth image as registered and the model prior to deformation. In an example, the deformation may include space carving the model by intersecting the current depth image with the model. In an example, the deformation may include calculating a surface that approximates the model using the modified depth-measurement data structure. The approximation may be based on a bounded iterative process to fit a surface to the modified depth-measurement data structure. This is a 3D technique akin to best-fitting a function to a set of 2D data points. In an example, calculating the surface may include using active contour segmentation. The active contour segmentation may use a level set evolution method of voxels in the modified depth-measurement data structure. In an example, the active contour segmentation may be restricted to maintain the model as a signed distance field. In an example, the bounded iterative process is restricted to voxels (e.g., in the depth-measurement data structure or in the model) that are near to the boundary of the target in the model.

At operation 630, optionally, the current depth image may be filtered. Filtering may include processing the depth image to fill holes. In an example, holes may be filled by dilating (e.g., expanding) voxels in the depth image. Filtering may also include regularizing the current depth image. In an example, regularizing may include determining and eliminating noise voxels from the depth image. In an example, the filtering may be done in a depth image pipeline between the depth camera and any of operations 605-625 (e.g., before the depth image is used).

At operation 635, optionally, the model may be initialized from an initialized form based on a first depth image received from the filtering (e.g., operation 630). In an example, the initialized form of the model may be created based on user input to place the target within the initialized form of the model. For example, a user interface may be presented that permits the user to draw a 3D shape around an image of the target. In an example, the initialized form of the model is a cube (e.g., as shown in FIGS. 2-5).

At decision 640, a determination may be made as to whether there are further depth images to process. In an example, the determination may be based on user input (e.g., a user interface receives a "finished scanning" indication or the like). In an example, the determination may be based on any one or more of time, number of depth images collected, etc.

At operation 645, either after all depth images have been acquired (e.g., as illustrated) or during depth image processing, the model may be converted into a triangle mesh. In an example, the triangles of the mesh may be smoothed. In an example, the smoothed triangles may be applied to a volumetric representation of the model.

Figure 7:
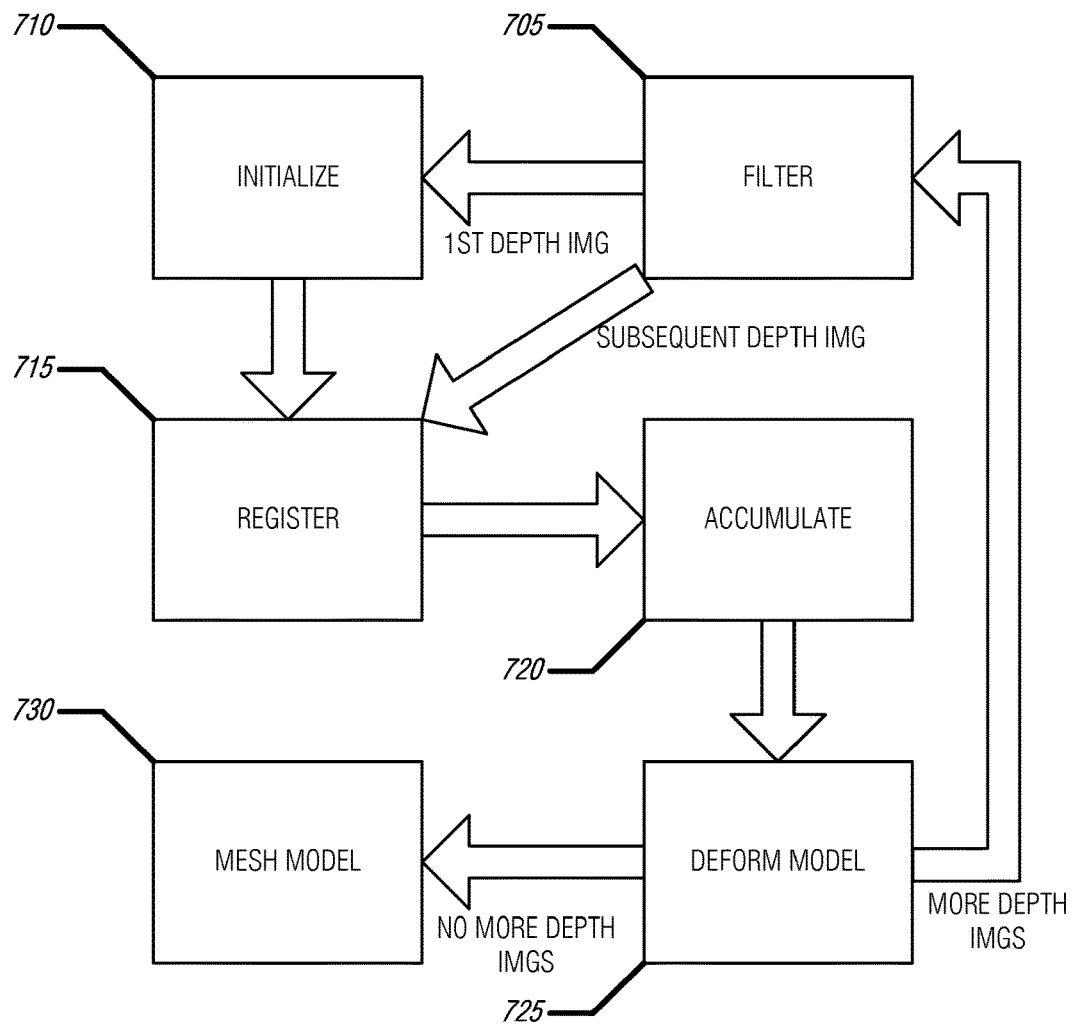
FIG. 7 illustrates a flow diagram of an example of a method for real-time 3D reconstruction with a depth camera, according to an embodiment.

FIG. 7 illustrates a flow diagram of an example of a method 700 for real-time 3D reconstruction with a depth camera, according to an embodiment. The operations of the method 700 may be performed with hardware, such as that described above. The method 700 is an example of a 3D model reconstruction.

At operation 705, a depth image may be filtered. In an example, the filtering may reduce noise. In an example, the filtering may fill holes.

At operation 710, an initial model may be created by carving the target's silhouette from a shape (e.g., a cube) based on a first depth image.

Operations 715-725 are performed iteratively over a set of depth images upon which the filtering of operation 705 is performed.

At operation 715, the current depth image is registered to the model.

At operation 720, the current depth frame is added to accumulation buffers (e.g., the depth-measurement data structure described above).

At operation 725, the model is deformed to match the current depth image (e.g., via carving similar to operation 710) and the accumulation buffers (e.g., in their latest state).

At operation 730, when there are no more depth images to process, a triangle mesh may be generated from the model. In an example, the mesh may be smoothed (e.g., to improve triangle quality). In an example, the mesh may be projected onto a volumetric representation of the target (e.g., the model).

The above iterative operations may be performed by the following pseudo code:

```
Reconstruct( ):: // reconstruct a 3D model from depth images
φ = -∞, w_D = 0, φ_D = 0, W_c = 0, φ_c = 0, M_0 = Identity //initialize terms
foreach X ∈ D
    ΔX = (I_0^D(π_0(X)) - f^-1(X)) // compute depth disparity
    φ_E(X) = ΔX_Z I_0^D(π_0(X)) + (1 - I_0^D(π_0(X)))∞ // compute envelope for
    first image
end
φ ← max(Φ{φ_E}(•) - τ,φ) // merge first envelope with model
for k = 1:K - 1
    Register(k) // register current depth image to model
    Accumulate(k) // add current depth image to accumulation buffers
    Deform(k) // deform model to match current depth image and current
    accumulation buffer
end
```

Figure 8:
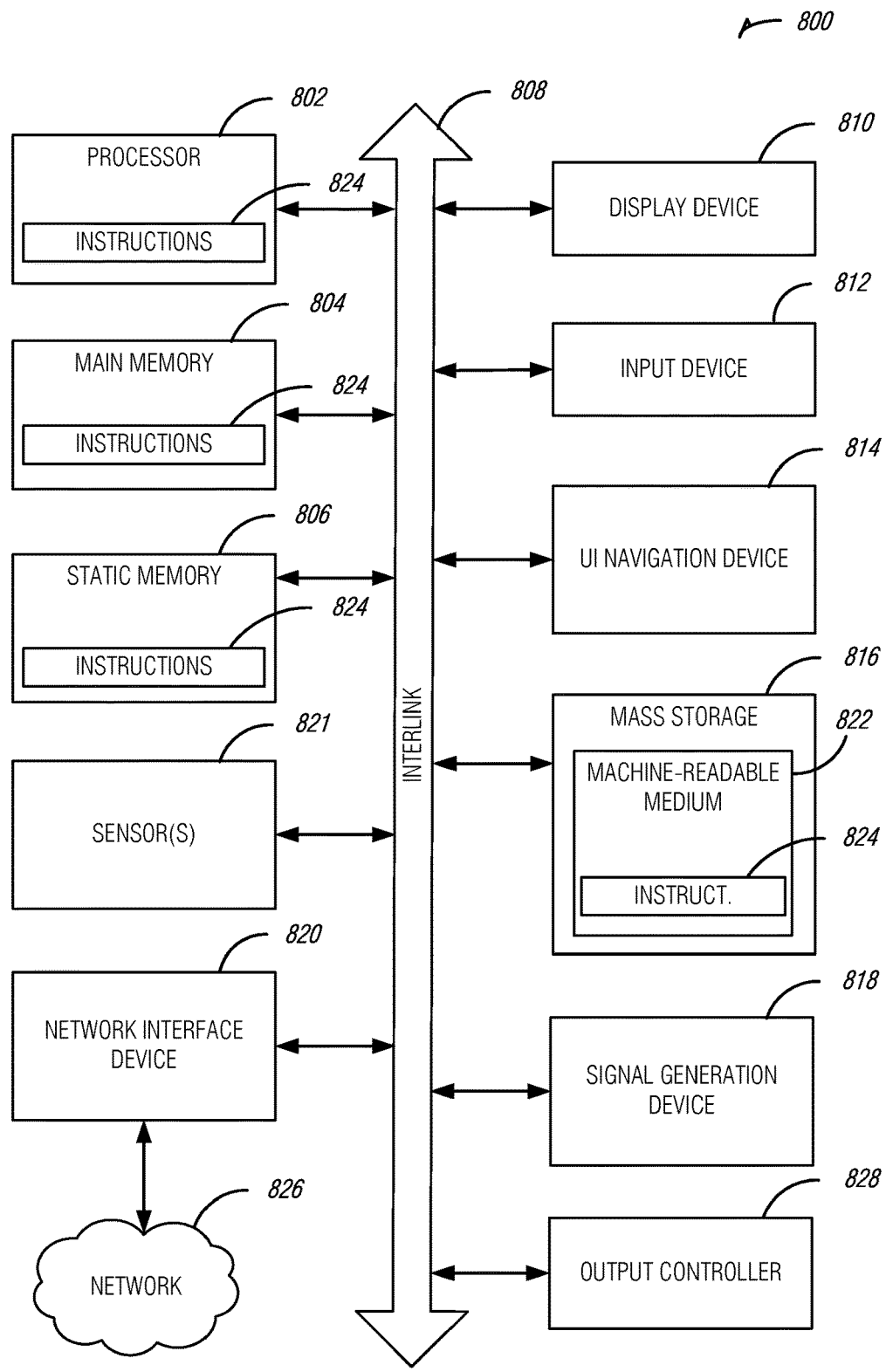
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES & EXAMPLES

Example 1 includes subject matter (such as a device, apparatus, or system for device for real-time 3D reconstruction with depth camera) comprising:
a depth-measurement data structure to store depth measurements received from a depth camera of a target; a model to store a three-dimensional representation of the target; a registration module to register a current depth image to the model, the current depth image received from the depth camera; an accumulation module to modify the depth-measurement data structure with the current depth image based on the registration; and a model deformation module to deform the model based on space carving and the modified depth-measurement data structure.

In Example 2, the subject matter of Example 1 may optionally include a filter module in a depth image pipeline between the depth camera and the accumulation module, the filter module to process the current depth image to at least one of fill holes in the depth data of the current depth image or reduce noise in the current depth image.

In Example 3, the subject matter of Example 2 may optionally include an initialization module to deform the model from an initialized form based on a first depth image received from the filter module.

In Example 4, the subject matter of any of Examples 1-3 may optionally include, wherein the initialized form of the model is created based on user input, the target being within the initialized form of the model.

In Example 5, the subject matter of any of Examples 1-4 may optionally include, wherein the initialized form of the model is a cube.

In Example 6, the subject matter of any of Examples 1-5 may optionally include, wherein at least one of the depth-measurement data structure or the model includes a voxel grid, the voxels of the voxel grid corresponding to points in space encompassing the target.

In Example 7, the subject matter of any of Examples 1-6 may optionally include, wherein the model includes a signed distance field.

In Example 8, the subject matter of any of Examples 1-7 may optionally include, wherein to register the current depth image to the model, the registration module is to: select a voxel in the model; extend the signed distance field of the model for the selected voxel into surrounding space to a current voxel; compute a gradient for the current voxel; compute a correspondence point on a boundary of the model that corresponds to the current voxel along the gradient; and store the correspondence point.

In Example 9, the subject matter of any of Examples 1-8 may optionally include, wherein the registration module is to iteratively select the voxel, extend the signed distance field, compute the gradient, compute the correspondence point, and store the correspondence point for a plurality of voxels in the model.

In Example 10, the subject matter of any of Examples 1-9, wherein the plurality of voxels are near the boundary of the target in the model, wherein a voxel that is near to the boundary is a voxel that is not farther away from the boundary than another voxel.

In Example 11, the subject matter of any of Examples 1-10 may optionally include, wherein the registration module is to: correlate a set of stored correspondence points to a three-dimensional point from the current depth image, the stored correspondence point in the set of stored correspondence points; use the set of stored correspondence points to determine rigid motion of the depth camera from a first pose; and use the rigid motion from the first pose to determine a second pose of the depth camera, the second pose corresponding to a pose of the depth camera in relation to the target.

In Example 12, the subject matter of any of Examples 1-11 may optionally include, wherein to modify the depth-measurement data structure with the current depth image based on the registration, the accumulation module is to: weight a point in the current depth image based on an angle of a ray traced from a focal point of the depth camera to the point, the focal point and the angle determined based on a pose of the depth camera determined from the registration of the current depth image; and combine the weight with a previous weight for the same point.

In Example 13, the subject matter of any of Examples 1-12 may optionally include, wherein the accumulation module is to accumulate color information for the point.

In Example 14, the subject matter of any of Examples 1-13 may optionally include, wherein the accumulation module is to weight the point and combine the weight for a plurality of points in the current depth image.

In Example 15, the subject matter of any of Examples 1-14 may optionally include, wherein to deform the model based on the modified depth-measurement data structure, the model deformation module is to: space carve the model by intersecting the current depth image with the model; and calculate a surface that approximates the model using the modified depth-measurement data structure, the approximation based on a bounded iterative process to fit the surface to the modified depth-measurement data structure.

In Example 16, the subject matter of any of Examples 1-15 may optionally include, wherein to calculate the surface includes the use of active contour segmentation, the active contour segmentation using a level set evolution technique on voxels in the modified depth-measurement data structure.

In Example 17, the subject matter of any of Examples 1-16 may optionally include, wherein the active contour segmentation is restricted to maintain the model as a signed distance field.

In Example 18, the subject matter of any of Examples 1-17 may optionally include, wherein the bounded iterative process is restricted to voxels that are near the boundary of the target in the model, wherein a voxel that is near to the boundary is a voxel that is not farther away from the boundary than another voxel.

In Example 19, the subject matter of any of Examples 1-18 may optionally include a mesh module to convert the model into a triangle mesh.

Example 20 may include, or may optionally be combined with the subject matter of any one of Examples 1-19 to include, subject matter (such as a method, means for performing acts, or machine readable medium including instructions that, when performed by a machine cause the machine to performs acts) for real-time 3D reconstruction with depth camera comprising: storing depth measurements received from a depth camera of a target in a depth-measurement data structure; storing a three-dimensional representation of the target in a model; registering a current depth image to the model, the current depth image received from the depth camera; modifying the depth-measurement data structure with the current depth image based on the registration; and deforming the model based on space carving and the modified depth-measurement data structure.

In Example 21, the subject matter of Example 20 may optionally include filtering, in a depth image pipeline between the depth camera and at least one of the registering, modifying, or deforming, the current depth image to at least one of processing the current depth image to fill holes in the depth data of the current depth image or reducing noise in the current depth image.

In Example 22, the subject matter of any of Examples 20-21 may optionally include initializing the model from an initialized form based on a first depth image received from the filtering.

In Example 23, the subject matter of any of Examples 20-22 may optionally include, wherein the initialized form of the model is created based on user input, the target being within the initialized form of the model.

In Example 24, the subject matter of any of Examples 20-23 may optionally include, wherein the initialized form of the model is a cube.

In Example 25, the subject matter of any of Examples 20-24 may optionally include, wherein at least one of the depth-measurement data structure or the model includes a voxel grid, the voxels of the voxel grid corresponding to points in space encompassing the target.

In Example 26, the subject matter of any of Examples 20-25 may optionally include, wherein the model includes a signed distance field.

In Example 27, the subject matter of any of Examples 20-21 may optionally include, wherein registering the current depth image to the model includes: selecting a voxel in the model; extending the signed distance field of the model for the selected voxel into surrounding space to a current voxel; computing a gradient for the current voxel; computing a correspondence point on a boundary of the model that corresponds to the current voxel along the gradient; and storing the correspondence point.

In Example 28, the subject matter of any of Examples 20-27 may optionally include iteratively performing the operations of Example 27 for a plurality of voxels in the model.

In Example 29, the subject matter of any of Examples 20-28 may optionally include, wherein the plurality of voxels are near the boundary of the target in the model, wherein a voxel that is near to the boundary is a voxel that is not farther away from the boundary than another voxel.

In Example 30, the subject matter of any of Examples 20-29 may optionally include, wherein registering the current depth image to the model includes: correlating a set of stored correspondence points to a three-dimensional point from the current depth image, the stored correspondence point in the set of stored correspondence points; determining rigid motion of the camera from a first pose using the set of stored correspondence points; and determining a second pose of the depth camera using the rigid motion from the first pose, the second pose corresponding to a pose of the depth camera in relation to the target.

In Example 31, the subject matter of any of Examples 20-30 may optionally include, wherein modifying the depth-measurement data structure with the current depth image based on the registration includes: weighting a point in the current depth image based on an angle of a ray traced from a focal point of the depth camera to the point, the focal point and the angle determined based on a pose of the depth camera determined from the registration of the current depth image; and combining the weight with a previous weight for the same point.

In Example 32, the subject matter of any of Examples 20-31 may optionally include accumulating color information for the point.

In Example 33, the subject matter of any of Examples 20-32 may optionally include performing the operations of Example 31 for a plurality of points in the current depth image.

In Example 34, the subject matter of any of Examples 20-33 may optionally include, wherein deforming the model based on the modified depth-measurement data structure includes: space carving the model by intersecting the current depth image with the model; and calculating a surface that approximates the model using the modified depth-measurement data structure, the approximation based on a bounded iterative process to fit the surface to the modified depth-measurement data structure.

In Example 35, the subject matter of any of Examples 20-34 may optionally include, wherein calculating the surface includes using active contour segmentation, the active contour segmentation using a level set evolution technique on voxels in the modified depth-measurement data structure.

In Example 36, the subject matter of any of Examples 20-35 may optionally include, wherein the active contour segmentation is restricted to maintain the model as a signed distance field.

In Example 37, the subject matter of any of Examples 20-36 may optionally include, wherein the bounded iterative process is restricted to voxels that are near the boundary of the target in the model, wherein a voxel that is near to the boundary is a voxel that is not farther away from the boundary than another voxel.

In Example 38, the subject matter of any of Examples 20-37 may optionally include converting the model into a triangle mesh.

Example 39 includes means to perform any technique of Examples 20-38.

Example 40 includes a machine-readable medium including instructions that, when executed by a machine, cause the machine to perform any technique of Examples 20-38.

Example 41 may include, or may optionally be combined with the subject matter of any one of Examples 1-40 to include, subject matter (a system, or means for performing acts for real-time 3D reconstruction with depth camera) comprising: means for storing depth measurements received from a depth camera of a target in a depth-measurement data structure; means for storing a three-dimensional representation of the target in a model; means for registering a current depth image to the model, the current depth image received from the depth camera; means for modifying the depth-measurement data structure with the current depth image based on the registration; and means for deforming the model based on space carving the modified depth-measurement data structure.

In Example 42, the subject matter of Example 41 may optionally include means for filtering, in a depth image pipeline between the depth camera and at least one of the registering, modifying, or deforming, the current depth image to at least one of processing the current depth image to fill holes in the depth data of the current depth image or reducing noise in the current depth image.

In Example 43, the subject matter of any of Examples 41-42 may optionally include means for initializing the model from an initialized form based on a first depth image received from the filter module.

In Example 44, the subject matter of any of Examples 41-43 may optionally include, wherein the initialized form of the model is created based on user input, the target being within the initialized form of the model.

In Example 45, the subject matter of any of Examples 41-44 may optionally include, wherein the initialized form of the model is a cube.

In Example 46, the subject matter of any of Examples 41-45 may optionally include, wherein at least one of the depth-measurement data structure or the model includes a voxel grid, the voxels of the voxel grid corresponding to points in space encompassing the target.

In Example 47, the subject matter of any of Examples 41-46 may optionally include, wherein the model includes a signed distance field.

In Example 48, the subject matter of any of Examples 41-47 may optionally include, wherein the means for registering the current depth image to the model include: means for selecting a voxel in the model; means for extending the signed distance field of the model for the selected voxel into surrounding space to a current voxel; means for computing a gradient for the current voxel; means for computing a correspondence point on a boundary of the model that corresponds to the current voxel along the gradient; and means for storing the correspondence point.

In Example 49, the subject matter of any of Examples 41-48 may optionally include means for iteratively performing the operations of Example 48 for a plurality of voxels in the model.

In Example 50, the subject matter of any of Examples 41-49 may optionally include, wherein the plurality of voxels are near the boundary of the target in the model, wherein a voxel that is near to the boundary is a voxel that is not farther away from the boundary than another voxel.

In Example 51, the subject matter of any of Examples 41-50 may optionally include, wherein the means for registering the current depth image to the model include: means for correlating a set of stored correspondence points to a three-dimensional point from the current depth image, the stored correspondence point in the set of stored correspondence points; means for determining rigid motion of the camera from a first pose using the set of stored correspondence points; and means for determining a second pose of the depth camera using the rigid motion from the first pose, the second pose corresponding to a pose of the depth camera in relation to the target.

In Example 52, the subject matter of any of Examples 41-51 may optionally include, wherein the means for modifying the depth-measurement data structure with the current depth image based on the registration include: means for weighting a point in the current depth image based on an angle of a ray traced from a focal point of the depth camera to the point, the focal point and the angle determined based on a pose of the depth camera determined from the registration of the current depth image; and means for combining the weight with a previous weight for the same point.

In Example 53, the subject matter of any of Examples 41-52 may optionally include means for accumulating color information for the point.

In Example 54, the subject matter of any of Examples 41-53 may optionally include means for performing the operations of Example 53 for a plurality of points in the current depth image.

In Example 55, the subject matter of any of Examples 41-54 may optionally include, wherein the means for deforming the model based on the modified depth-measurement data structure include: means for space carving the model by intersecting the current depth image with the model; and means for calculating a surface that approximates the model using the modified depth-measurement data structure, the approximation based on a bounded iterative process to fit the surface to the modified depth-measurement data structure.

In Example 56, the subject matter of any of Examples 41-55 may optionally include, wherein the means for calculating the surface include means for using active contour segmentation, the active contour segmentation using a level set evolution technique on voxels in the modified depth-measurement data structure.

In Example 57, the subject matter of any of Examples 41-56 may optionally include, wherein the active contour segmentation is restricted to maintain the model as a signed distance field.

In Example 58, the subject matter of any of Examples 41-57 may optionally include, wherein the bounded iterative process is restricted to voxels that are near the boundary of the target in the model, wherein a voxel that is near to the boundary is a voxel that is not farther away from the boundary than another voxel.

In Example 59, the subject matter of any of Examples 41-58 may optionally include means for converting the model into a triangle mesh.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A hardware-implemented method for real-time three-dimensional (3D) reconstruction with depth camera, the method comprising:
   storing depth measurements received from a depth camera of a target in a depth-measurement data structure;
   storing a three-dimensional representation of the target in a model;
   registering a current depth image to the model, the current depth image received from the depth camera; and
   modifying the depth-measurement data structure with the current depth image based on the registration, wherein modifying includes
      weighting a point in the current depth image based on a ray tracing angle from a focal point of the depth camera to the point, the focal point, and the angle based on a pose of the depth camera as determined from the registration of the current depth image,
      combining the weight of the point with a previous weight for the point, and
   deforming the model based on space carving and the modified depth-measurement data structure.

2. The method of claim 1, wherein at least one of the depth-measurement data structure or the model includes a voxel grid, the voxels of the voxel grid corresponding to points in space encompassing the target.

3. The method of claim 2, wherein the model includes a signed distance field.

4. The method of claim 3, wherein registering the current depth image to the model includes:
   selecting a voxel in the model;
   extending the signed distance field of the model for the selected voxel into surrounding space to a current voxel;
   computing a gradient for the current voxel;
   computing a correspondence point on a boundary of the model that corresponds to the current voxel along the gradient; and
   storing the correspondence point.

5. The method of claim 4, comprising iteratively performing operations of claim 4 for a plurality of voxels in the model.

6. The method of claim 5, wherein the plurality of voxels is near the boundary of the target in the model, wherein a voxel that is near to the boundary is a voxel that is not farther away from the boundary than another voxel.

7. The method of claim 4, wherein registering the current depth image to the model includes:
   correlating a set of stored correspondence points to a three-dimensional point from the current depth image, the stored correspondence point in the set of stored correspondence points;
   determining rigid motion of the camera from a first pose using the set of stored correspondence points; and
   determining a second pose of the depth camera using the rigid motion from the first pose, the second pose corresponding to a pose of the depth camera in relation to the target.

8. A non-transitory machine-readable tangible medium including instructions that, when executed by a machine, cause the machine to perform operations comprising:
   storing depth measurements received from a depth camera of a target in a depth-measurement data structure;
   storing a three-dimensional representation of the target in a model;
   registering a current depth image to the model, the current depth image received from the depth camera; and
   modifying the depth-measurement data structure with the current depth image based on the registration, wherein modifying includes
      weighting a point in the current depth image based on a ray tracing angle from a focal point of the depth camera to the point, the focal point, and the angle based on a pose of the depth camera as determined from the registration of the current depth image,
      combining the weight of the point with a previous weight for the point, and
   deforming the model based on space carving and the modified depth-measurement data structure.

9. The non-transitory machine-readable tangible medium of claim 8, wherein at least one of the depth-measurement data structure or the model includes a voxel grid, the voxels of the voxel grid corresponding to points in space encompassing the target.

10. The non-transitory machine-readable tangible medium of claim 9, wherein the model includes a signed distance field.

11. The non-transitory machine-readable tangible medium of claim 10, wherein registering the current depth image to the model includes:
   selecting a voxel in the model;
   extending the signed distance field of the model for the selected voxel into surrounding space to a current voxel;
   computing a gradient for the current voxel;

computing a correspondence point on a boundary of the model that corresponds to the current voxel along the gradient; and storing the correspondence point.

12. The non-transitory machine-readable tangible medium of claim 11, comprising iteratively performing operations of claim 11 for a plurality of voxels in the model.

13. The non-transitory machine-readable tangible medium of claim 12, wherein the plurality of voxels is near the boundary of the target in the model, wherein a voxel that is near to the boundary is a voxel that is not farther away from the boundary than another voxel.

14. The non-transitory machine-readable tangible medium of claim 11, wherein registering the current depth image to the model includes:

correlating a set of stored correspondence points to a three-dimensional point from the current depth image, the stored correspondence point in the set of stored correspondence points;

determining rigid motion of the camera from a first pose using the set of stored correspondence points; and determining a second pose of the depth camera using the rigid motion from the first pose, the second pose corresponding to a pose of the depth camera in relation to the target.

15. An apparatus to facilitate real-time three-dimensional (3D) reconstruction with depth camera, the apparatus comprising:

a processor to:

facilitate storing of depth measurements received from a depth camera of a target in a depth-measurement data structure;

facilitate storing of a three-dimensional representation of the target in a model;

register a current depth image to the model, the current depth image received from the depth camera; and modify the depth-measurement data structure with the current depth image based on the registration, wherein modifying includes weighting a point in the current depth image based on a ray tracing angle from a focal point of the depth camera to the point, the focal point, and the angle based on a pose of the depth camera as determined from the registration of the current depth image, combining the weight of the point with a previous weight for the point, and deform the model based on space carving and the modified depth-measurement data structure; and a memory communicatively coupled to the processor.

16. The apparatus of claim 15, wherein at least one of the depth-measurement data structure or the model includes a voxel grid, the voxels of the voxel grid corresponding to points in space encompassing the target.

17. The apparatus of claim 16, wherein the model includes a signed distance field.

18. The apparatus of claim 17, wherein when registering the current depth image to the model, the processor is further to:

select a voxel in the model;

extend the signed distance field of the model for the selected voxel into surrounding space to a current voxel;

compute a gradient for the current voxel;

compute a correspondence point on a boundary of the model that corresponds to the current voxel along the gradient; and store the correspondence point.

19. The apparatus of claim 18, comprising iteratively performing operations of claim 18 for a plurality of voxels in the model.

20. The apparatus of claim 19, wherein the plurality of voxels is near the boundary of the target in the model, wherein a voxel that is near to the boundary is a voxel that is not farther away from the boundary than another voxel.

21. The apparatus of claim 18, wherein when registering the current depth image to the model, the processor is further to:

correlate a set of stored correspondence points to a three-dimensional point from the current depth image, the stored correspondence point in the set of stored correspondence points;

determine rigid motion of the camera from a first pose using the set of stored correspondence points; and determine a second pose of the depth camera using the rigid motion from the first pose, the second pose corresponding to a pose of the depth camera in relation to the target.

* * * * *